United States Patent [19]

Apeldoorn

[11] Patent Number: 4,528,592
[45] Date of Patent: Jul. 9, 1985

[54] TV-IF CIRCUIT

[75] Inventor: Hans J. Apeldoorn, Eindhoven, Netherlands

[73] Assignee: U.S. Philips Corporation, New York, N.Y.

[21] Appl. No.: 460,414

[22] Filed: Jan. 24, 1983

[30] Foreign Application Priority Data

Jan. 29, 1982 [NL] Netherlands .................. 8200328

[51] Int. Cl.³ .................. H04N 5/60; H04N 5/62
[52] U.S. Cl. .................. 358/198; 358/197
[58] Field of Search .................. 358/196, 197, 198; 329/163–164, 110, 142, 143; 455/303–305

[56] References Cited

U.S. PATENT DOCUMENTS

| 4,349,842 | 9/1982 | Apeldoorn | 358/197 |
| 4,395,735 | 7/1983 | Holmes | 358/198 |
| 4,419,695 | 12/1983 | Yamamoto | 358/198 |
| 4,470,071 | 9/1984 | Rindal | 358/198 |

OTHER PUBLICATIONS

"Bipolar ICs for Video Equipment" Philips Data Handbook–Integrated Circuits, Part 2, Jan. 1983.
Aufbereitung des Fernsehtonsignals mit den Integrierten Schaltungen TDA 2545 und TDA 2546 nach dem Quasi-Paralleltonverfahren, Valvo Entwicklungsmitteilungen, Achterberg et al., pp. 1–37, Nov. 1980.

Primary Examiner—Michael A. Masinick
Attorney, Agent, or Firm—Thomas A. Briody; William J. Streeter; Edward W. Goodman

[57] ABSTRACT

TV-IF circuit comprising a balanced video signal path ($A_5$, M, $A_6$, VM) arranged between an IF-input (1, 1') and a video signal output (2, 2') and a balanced sound signal path ($A_1$, $A_2$, $A_7$, SM) arranged between the IF-input (1, 1') and a sound signal output (3, 3'), these two paths comprising a video mixing stage (VM) and a sound mixing stage (SM), respectively for a quasi-parallel sound signal processing or an intercarrier sound signal processing. The compatability between these two modes of sound signal processing increases the range of applications compared with prior art TV-IF circuits and this is accomplished by a matrix circuit (M) comprising a balanced, non-inverting (5, 5') and a balanced, inverting (4, 4') input, as well as a balanced output (6, 6'), the matrix circuit (M) being included via the non-inverting input (5, 5') and the output (6, 6') in one ($A_5$, M, $A_6$, VM) of said two signal paths ($A_5$, M, $A_6$, VM or $A_1$, $A_2$, $A_7$, SM) between the IF-input (1, 1') and a signal input (7, 7') of the mixing stage (VM) in this signal path ($A_5$, M, $A_6$, VM), the other signal path ($A_1$, $A_2$, $A_7$ SM) between the IF-input (1, 1') and a signal input (10, 10') of the mixing stage (SM) in the last-mentioned signal path ($A_1$, $A_2$, $A_7$, SM) being connected to the balanced, inverting input (4, 4') of the matrix circuit (M) and comprising between the IF-input (1, 1') and the matrix circuit (M) a balanced first pair of terminals (9, 9') which may optionally be shortcircuited, remain open-circuited or for connecting therebetween a resonant circuit (FSC) having a resonant frequency which corresponds to a sound carrier frequency of the TV-IF signal applied to the IF-input.

8 Claims, 5 Drawing Figures

TV-IF CIRCUIT

BACKGROUND OF THE INVENTION

The invention relates to a TV-IF circuit comprising a balanced video signal path arranged between an IF-input and a video signal output, and a balanced sound signal path arranged between the IF-input and a sound signal output, these paths including a video mixing stage and a sound mixing stage, respectively.

Such a TV-IF circuit is known as a TV-IF circuit for quasi-parallel sound processing and is described in the publication "Aufbereitung des Fernsehtonsignals mit den integrierten Schaltungen TDA 2545 und TDA 2546 nach dem Quasi-Paralleltonverfahren" pulbished in the series "Valvo Entwicklungsmitteilungen", November 1980.

An IF-TV signal applied to the known TV-IF circuit is separated therein into a video and a sound signal. To that end the TV-IF circuit comprises two filter circuits, connected to the IF-input, one filter circuit suppressing the sound carrier of the TV-IF signal and being included in the video signal path and the other filter circuit suppressing the video information with the exception of the picture carrier and being included in the sound signal path. As a result thereof the video signal path contains virtually no sound signal components which may disturb the video signal after demodulation in the video mixing stage and the sound signal path contains virtually no video signal components which may disturb the sound signal after intercarrier mixing of the sound carrier and the picture carrier in the sound mixing stage. During this intercarrier mixing, the frequency of the sound signal modulated on the sound carrier is converted into a sound intermediate frequency which corresponds to the picture-sound carrier spacing in the TV-IF signal. The IF-sound signal thus obtained is not affected by unwanted frequency shifts of the tuning oscillator.

Because of the separated signal processing, the video and sound output signals of the known TV-IF cirucit are disturbed to a lesser extent than those of a TV-IF circuit in which signal processing is effected which is used in common for video and sound signals. In such a so-called TV-IF circuits for intercarrier sound processing, which are also described in the above-mentioned publication, the whole TV-IF signal, optionally after partial suppression of the sound carrier, is applied to the video mixing stage. Thereafter mixing of the TV-IF signal with the picture carrier is effected in the video mixing stage, as a result of which the demodulation of the video signal and, simultaneously, a conversion of the sound signal frequency into the said sound intermediate frequency is obtained in response to an intercarrier mixing of the sound carrier and the picture carrier. In contrast with TV-IF circuits for quasi-parallel sound processing, the demodulated video signal and the IF sound signal are both available here at the same output of the video detector for further signal processing and, because of the common mixing in the video mixing stage, each of the two signals comprises residual components of the other signal.

TV-IF circuits for quasi-parallel sound processing are mainly used in TV-receivers which must satisfy high quality requirements as regards picture display and sound reproduction. Partly due to the high quality requirements which also the other receiver circuits must satisfy, such high-quality TV-receivers are generally comparatively expensive and are only sold in a limited number. Consequently, the production of TV-IF circuits for quasi-parallel sound processing is limited. As a result thereof and also because of the fact that the circuit itself if rather complicated, such circuits are in the present state of the art much more expensive than TV-IF circuits for intercarrier sound processing.

In contrast therewith, the TV-IF circuits for intercarrier sound processing are less complicated and particularly suitable for use in TV-receivers on which lower quality requirements are imposed. The lower quality requirements make it possible to use for the entire TV-receiver simple and cheap receiver circuits so that TV-receivers of this type can be much cheaper than the first-mentioned high-quality TV-receivers. The demand for the cheap TV-receivers is comparatively high and consequently also the production of the last-mentioned TV-IF circuits.

SUMMARY OF THE INVENTION

On the one hand, the invention has for its object to increase the suitability for use of the known TV-IF circuits for quasi-parallel sound processing by making these TV-IF compatible with TV-IF circuits for intercarrier sound processing and, on the other hand, to provide a possibility to simplify the circuit and to improve the suppression of unwanted signal components in both signal paths.

According to the invention, a TV-IF circuit of the type described in the opening paragraph, is characterized by a matrix circuit having a balanced, non-inverting and a balanced, inverting input, as well as a balanced output, this matrix circuit being included via its non-inverting input and its output in one of the two signal paths between the IF-input and a signal input if the mixing stage in this signal path, the other signal path between the IF-input and a signal input of the mixing stage in the other signal path being connected to the balanced, inverting input of the matrix circuit and comprising between the IF-input and the matrix circuit a balanced first pair of terminals which may optionally be shortcircuited or remain open-circuited for connecting therebetween a resonant circuit having a resonant frequency which corresponds to a sound carrier frequency of the TV-IF signal applied to the IF-input.

The use of the measure in accordance with the invention provides, by connected or not connecting a resonant circuit between said balanced first pair of terminals, the possibility for a quasi-parallel or an intercarrier signal processing in the TV-IF circuit in accordance with the invention. The TV-IF circuit in accordance with the invention is consequently suitable for use in both the more expensive high-quality TV-receivers and the TV-receivers on which less stringent quality requirements are imposed. A large scale production of such TV-IF circuits is therefore possible. As a result thereof the price per unit can be lower than the unit price of prior art TV-IF circuits.

In addition, the use of the measure in accordance with the invention, when the TV-IF circuit in accordance with the invention is used for a quasi-parallel sound processing, results in that by the use of one resonant circuit both the sound signal components in the video signal path and the video signal components in the sound signal path can be suppressed. The use of several complicated filter circuits as required for the same signal separation, in the prior art TV-If circuit for quasi-parallel signal processing, are therefore superfluous.

A preferred embodiment of a TV-IF circuit in accordance with the invention is characterized in that the matrix circuit is included in the video signal path and the balanced first pair of terminals is included in the sound signal path, this first pair of terminals being short-circuited or interconnected via a resonant circuit having a band rejection characteristic.

By means of this measure, by an adequate adjustment of the signal amplitudes in the matrix circuit, the sound signal can be totally suppressed in the video signal path.

A further preferred embodiment of a TV-IF circuit in accordance with the invention, is characterized by a further balanced sound signal path an input of which is connected, via a further balanced pair of terminals for connecting therebetween a band rejection resonant circuit having a resonant frequency which corresponds to a further sound carrier frequency of the TV-IF signal being applied to the IF-input, to a further sound mixing stage, said input of the further sound signal path on the other hand being connected to the output of the matrix circuit and on the other hand via the further pair of terminals to an inverting input of a further matrix circuit, which further matrix circuit is connected via a non-inverting input to the IF-input and via an output to the video mixing stage.

This measure can be used with special advantage in the processing of more than one sound signal as it results in a significant reduction the mutual crosstalk between the sound signals to be processed.

A further preferred embodiment of such a TV-IF circuit in accordance with the invention is characterized by a push-pull amplifier connected to the IF-input, the output of this amplifier being connected to the balanced first pair of terminals and also to the base input of a balanced first pair of transistors, as well as by a balanced second pair of transistors also connected to the IF-input, the emitter output of the first transistor pair being connected via the matrix circuit to the collector output of the second transistor pair, which matrix circuit comprises two resistors which crosswise connect said emitter output of the first transistor pair to said collector output of the second transistor pair, also comprising a resistor which interconnects said two resistors.

DESCRIPTION OF THE DRAWINGS

The invention will now be further described by way of example with reference to the Figures shown in the accompanying drawings.

Herein.

DESCRIPTION OF THE PREFERRED EMBODIMENT

Figure 1:
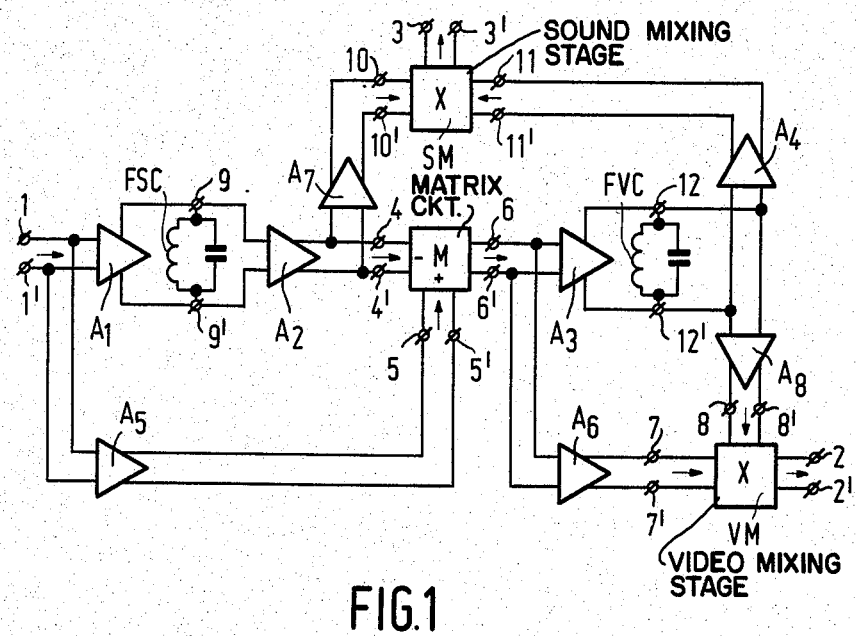
FIG. 1 shows a block diagram of a first embodiment of a TV-IF circuit in accordance with the invention.

FIG. 1 shows a first embodiment of a TV-IF circuit in accordance with the invention, comprising a balanced video signal path $A_5$, M, $A_6$, VM connected between an IF-input 1, 1' and a video signal output 2, 2', and a balanced sound signal $A_1$, $A_2$, $A_7$, SM connected between the IF-input 1, 1' and a sound signal output 3, 3'.

The video signal path $A_5$, M, $A_6$, VM comprises a matrix circuit M having a balanced, inverting and a balanced non-inverting input with terminals 4, 4' and 5, 5', respectively and a balanced output with terminals 6 and 6', as well as a synchronous video detector VM having a balanced signal input with terminals 7 and 7', a balanced carrier input with terminals 8 and 8' and a signal output connected to the video output 2, 2'. The IF-input 1, 1' is connected via an amplifier $A_5$ to the non-inverting input 5, 5' of the matrix circuit M, while the output 6, 6' of the matrix circuit M is connected to the signal input 7, 7' of the video detector VM via an amplifier $A_6$.

The sound signal path $A_1$, $A_2$, $A_7$, SM comprises a first balanced terminal pair 9, 9' between which a resonant circuit FSC is arranged when the TV-IF circuit is used for a quasi-parallel sound processing. This resonant circuit FSC has a resonant frequency which corresponds to the sound carrier frequency (33.4 MHz) of the TV-IF signal applied to the IF-input 1, 1'. The sound signal path $A_1$, $A_2$, $A_7$, Sm also comprises a sound mixing stage SM having a balanced signal input with terminals 10 and 10', a balanced carrier input with terminals 11 and 11' and a balanced output, which is connected to the sound signal output 3, 3'. The IF-input 1, 1' is connected to the first terminal pair 9, 9' via a buffer amplifier $A_1$. The first terminal pair 9, 9' is further connected via a buffer amplifier $A_2$, on the one hand, via an amplifier $A_7$ to the signal input 10, 10' of the sound mixing stage SM and, on the other hand, to the inverting input 4, 4' of the matrix circuit M.

The balanced output 6, 6' of the matrix circuit M is connected via a buffer amplifier $A_3$ to a balanced second terminal pair 12, 12' between which a resonant circuit FVC is connected when the TV-IF circuit is used for quasi-parallel sound processing. The resonant circuit FVC has a resonant frequency which is equal to the picture carrier frequency (38.9 MHz) of the TV-IF signal to be processed. The second terminal pair 12, 12' is connected via an amplifier $A_4$ to the carrier input 11, 11' of the sound detector SM, and via an amplifier $A_8$ to the carrier input 8, 8' of the video detector VM.

The amplifiers $A_4$ to $A_8$, inclusive, are predominantly used to set a proper signal amplitude, the buffer amplifiers $A_1$ to $A_3$, inclusive, are predominantly used as separation stages to prevent, for example, a mutual shortcircuiting of the first terminal pair 9, 9' or of the second terminal pair 12, 12' from resulting in an unwanted shortcircuiting of the signal path connected in parallel therewith. A detailed description of the function of these amplifiers $A_1$ to $A_8$, inclusive, is not necessary for an understanding of the invention and is therefore omitted for the sake of clarity.

A TV-IF signal applied to the IF-input 1, 1' is wholly applied to the non-inverting signal input 5, 5' of the matrix circuit M after adequate amplification in the amplifier $A_5$, on the one hand, and, on the other hand, after having passed through the buffer amplifier $A_1$ when the TV-IF circuit is used for a quasi-parallel sound processing, is filtered in the resonant circuit FSC which is arranged between the two first pair of terminals 9, 9'. The resonant circuit FSC is tuned to the sound carrier frequency (33.4 MHz) of the TV-IF signal to be processed and realizes a very high impedance for frequencies at and near this sound carrier frequency and a low impedance to substantially a shortcircuit for the other frequencies. As the signals at the pair of terminals 9, 9' are mutually balanced, the resonant circuit FSC may be of a simple construction, for example in the form of a parallel LC circuit as shown in the drawing. Thus, the resonant circuit FSC effects a selection of the sound signal, modulated on the sound carrier, from the TV-IF signal, which sound signal, after passing the buffer amplifier $A_2$, is applied to the inverting signal input 4, 4' of the matrix circuit M and also, after adequate amplification in the amplifier $A_7$ to the signal input 10, 10' of the sound detector SM.

In the matrix circuit M the sound signal applied to the inverting signal input 4, 4' is subtracted from the total TV-IF signal applied to the non-inverting signal input 5, 5'. As a result thereof, the video signal, that is to say the TV-IF signal with suppressed sound carrier is available at the output 6, 6' of the matrix circuit M with the same polarity as the TV-IF signal at the non-inverting signal input 5, 5'. This video signal is applied after adequate amplification in the amplifier $A_6$ to the signal input 7, 7' of the video detector VM and also, after passing the buffer amplifier $A_3$, to the second pair of terminals 12, 12'.

The resonant circuit FVC arranged between this pair of terminals 12, 12' is tuned to the picture carrier frequency (38.9 Hz) and realizes a very high impedance for frequencies at and near the picture carrier frequency (38.9 MHz) and a low impedance to substantially a shortcircuit for the other frequencies. As a result thereof, the picture carrier is filtered from the video signal applied to the pair of terminals 12, 12', which picture carrier is applied to the picture carrier input 11, 11' of the sound mixing stage SM via the amplifier $A_4$ and to the picture carrier input 8, 8' of the video mixing stage VM via the amplifier $A_8$.

In the sound mixing stage SM the intercarrier of the modulated 33.4 MHz sound carrier applied to the signal input 10, 10' and the 38.9 MHz picture carrier applied to the picture carrier input 11, 11' are mixed. As a result thereof a 5.5 MHz IF-sound signal is obtained at the sound signal output 3, 3', which sound signal is processed in a sound detector, not shown, into an audio-frequency mono or stereophonic sound signal.

In the video mixing stage VM a synchronous detection of the video-signal occurs which video signal is available in the basic frequency band at the video output 2, 2' for further processing in a video output stage, not shown.

In the embodiment shown, the sound signal is quasi-parallel processed. The separation between the sound and the video signals required therefor is achieved by means of the matrix circuit M and a simple resonant circuit FSC, which may be in the form of a simple parallel LC or RLC network. By means of a proper mutual adjustment of the signal amplitudes of the sound signal and the complete TV-IF signal at the input terminals 4, 4' and 5, 5', respectively, by means of the amplifier $A_5$, and, optionally, the buffer amplifier $A_2$, a full suppression of the sound signal in the video signal can further be obtained.

The selection of the picture carrier is effected by means of a simple resonant circuit FVC, which, as the resonant circuit FSC, may be in the form of a single parallel LC or RLC network. In addition, the selection of the picture carrier from the video signal is a guarantee that no residual components of the sound signal are present in the picture carrier signal at the picture carrier inputs 8, 8' and 11, 11' of the video mixing stage VM and the sound mixing stage SM, respectively, which residual components might have a disturbing influence on the output signal of these mixing stages.

For an intercarrier sound processing, the first pair of terminals 9, 9' must first be mutually shortcircuited, which results in no signal being applied to the sound mixing stage SM, while there is also no signal at the inverting signal input 4, 4' of the matrix circuit M. Thus, the sound mixing stage SM is inoperative and does not supply a signal at its signal output 3, 3'.

The TV-IF signal applied to the IF-input 1, 1' passes completely through the amplifier $A_5$, the matrix circuit M and the amplifier $A_6$ and is demodulated in accordance with the intercarrier method in the video mixing stage VM. If synchronous demodulation is desired, then in the resonance circuit FVC, arranged between the second pair of terminals 12, 12', the picture carrier is selected from the TV-IF signal being applied via the signal output 6, 6' of the matrix circuit M, which picture carrier is applied to the picture carrier input 8, 8' of the video mixing stage VM, which now operates as a multiplicative stage. A multiplicative intercarrier mixing of the modulated sound carrier with the picture carrier and simultaneously a synchronous detection of the video signal then taking place in the video mixing stage VM. Thus, both the 5.5 MHz IF-sound signal and the baseband video signal are then available at the video output 2, 2' for further signal processing in sound and video output stages not shown.

If, for example, for reasons of competition, the use of a cheap non-linear envelope detector as a video mixing stage VM is desired, then also the second pair of terminals 12, 12' can be mutually shortcircuited. In the video mixing stage VM an additive intercarrier mixing of the modulated sound carrier with the detector carrier and simultaneously a non-linear detection of the video signal takes place, so that at the video output 2, 2' again both the 5.5 MHz IF-sound signal and the baseband video signal are available for further signal processing, not shown.

Figure 2:
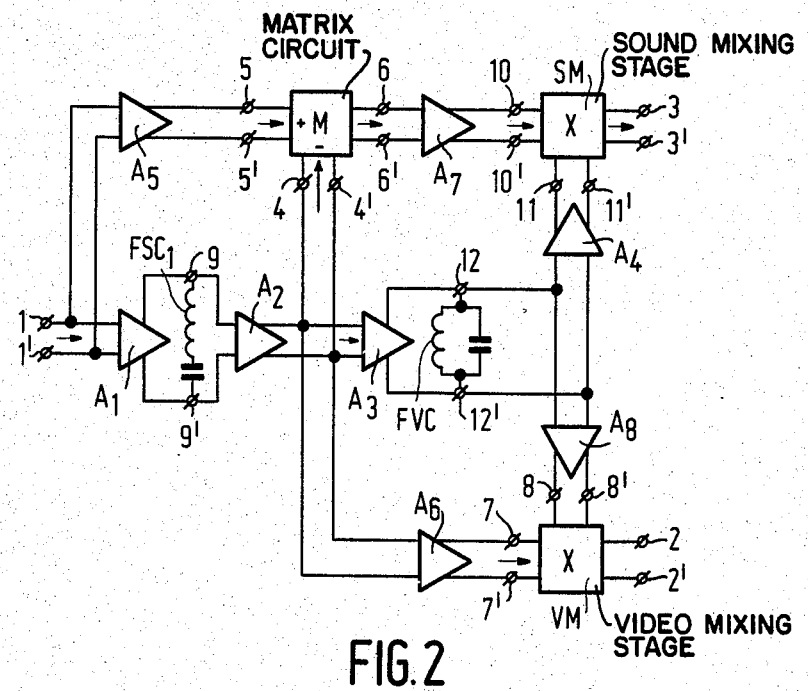
FIG. 2 shows a block diagram of a second embodiment of a TV-IF circuit in accordance with the invention.

FIG. 2 shows a second embodiment of a TV-IF circuit in accordance with the invention, the elements which corrrespond to the elements of the TV-IF circuit of FIG. 1 are given the same reference numerals.

When this TV-IF circuit is used for a quasi-parallel sound processing, a series resonant circuit $FSC_1$ must be arranged between the first pair of terminals 9, 9' and the parallel resonant circuit FVC between the second pair of terminals. As in the case of the TV-IF circuit of FIG. 1, also these resonant circuits are tuned to the 33.4 MHz sound carrier and the 38.9 MHz picture carrier, respectively. In contrast with the TV-IF circuit of FIG. 1, there is now, however, no separation of the TV-IF signal to be processed into separate video and sound signals by first selecting the sound signal from the TV-IF signal and by subtracting this sound signal thereafter in the matrix circuit M is first selected from the complete TV-IF signal, but by first selecting the video signal from the TV-IF signal and then this video signal is subtracted thereafter in the matrix circuit M from the complete TV-IF signal.

The video signal path then comprises the first pair of terminals 9, 9' between the IF-input 1, 1' and the video mixing stage VM, and between the first pair of terminals 9, 9' and the video mixing stage VM the video signal path being connected to the inverting input 4, 4' of the matrix circuit M.

Between the IF-input 1, 1' and the sound mixing stage SM, the sound signal path comprises the matrix circuit M, the non-inverting input 5, 5' thereof being connected via the amplifier $A_5$ to the IF-input 1, 1', and the output 6, 6' thereof via the amplifier $A_7$ to the signal input 10, 10' of the sound mixing stage SM.

The selection of the video signal is effected by suppressing, by means of the series resonant circuit $FSC_1$, the modulated sound carrier of the TV-IF signal applied to the first pair of terminals 9, 9' via the buffer amplifier $A_1$. This series resonant circuit $FSC_1$ realizes a low impedance to substantially a shortcircuit for frequencies at and near the sound carrier and a high impedance for other frequencies. Thereafter the video signal is applied via the amplifier $A_2$ to, on the one hand, the inverting input 4, 4' of the matrix circuit M, and subtracted therein from the complete TV-IF signal being applied via the amplifier $A_5$ to the non-inverting input 5, 5' of the matrix circuit M, and, on the other hand, to the video mixing stage VM via the amplifier $A_6$. Thus, there is supplied at the output 6, 6' of the matrix circuit M, the sound signal which is applied to the signal input 10, 10' of the sound mixing stage SM via the amplifier $A_7$.

The video signal at the first pair of terminals 9, 9' is also applied via the amplifiers $A_2$ and $A_3$ to the second pair of terminals 12, 12', where, by means of the parallel 38.9 MHz resonant circuit FVC, the 38.9 MHz picture carrier is selected. As was the case in the aforementioned TV-IF circuit, this picture carrier is applied via the amplifier $A_4$ to the carrier input 11, 11' of the sound mixing stage SM and via the amplifier $A_8$ to the carrier input 8, 8' of the video mixing stage VM, respectively, where, in the manner described in the foregoing, a synchronous detection of the video signal and intercarrier mixing, respectively, of the modulated 33.4 MHz sound carrier and the 38.9 MHz picture carrier is effected. Also here the baseband video signal is available at the video output 2, 2' and the 5.5 MHz IF-sound signal at the sound output 3, 3' for further processing in video and sound output stages, not shown.

For intercarrier sound processing, it is sufficient to omit the resonant circuit $FSC_1$. No signal is then present at the output 6, 6' of the matrix circuit M. The sound mixing stage SM is then not operative. The TV-IF signal is now completely applied to the video mixing stage VM, where, in the manner described with reference to FIG. 1, an additive or multiplicative mixing of the TV-IF signal with the picture carrier is effected. As in the aforementioned TV-IF circuit, this results in a baseband video signal and a 5.5 MHz IF-sound signal at the video output 2, 2'.

Figure 3:
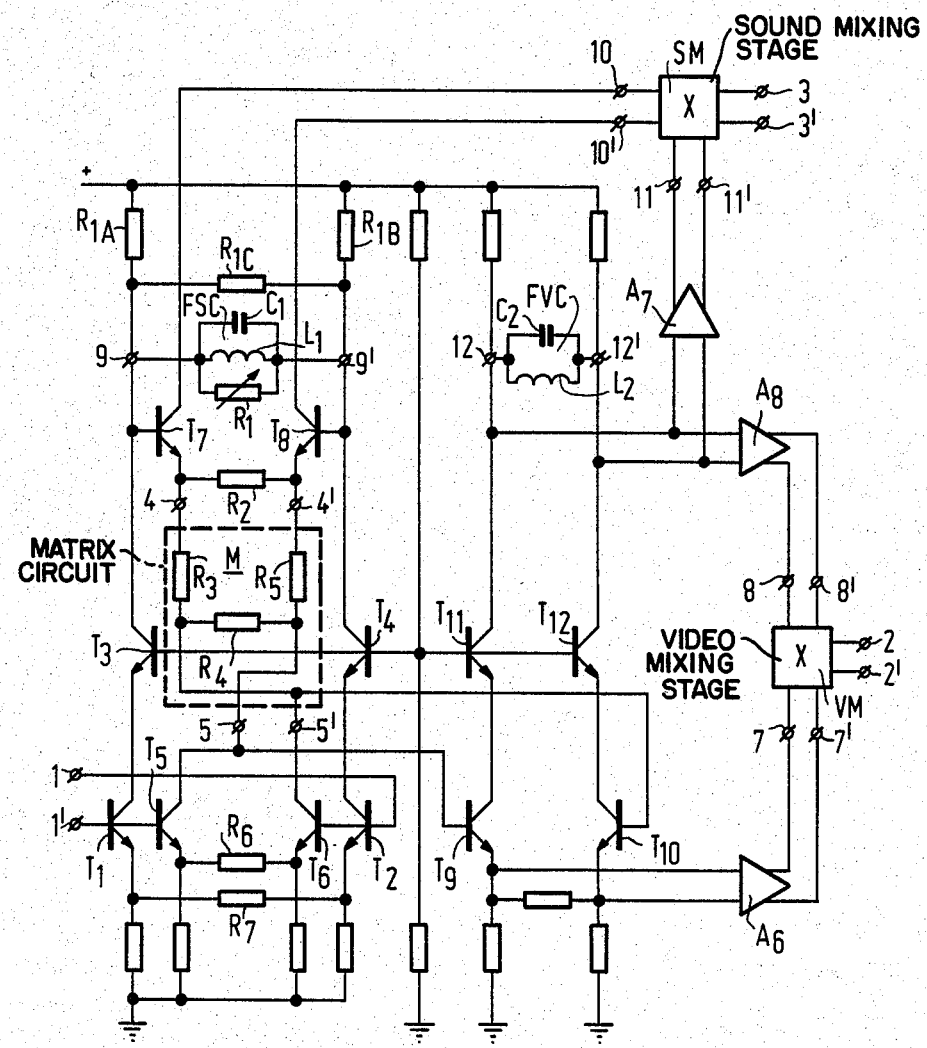
FIG. 3 shows a practical embodiment of the TV-IF circuit of FIG. 1.

FIG. 3 shows a practical embodiment of the TV-IF circuit of FIG. 1, which is particularly suitable for integration.

The elements corresponding to the elements of the TV-IF circuit of FIG. 1 are referenced correspondingly. The shown resistors without reference numerals have for their object to provide a correct working point of the circuit and are not important for understanding the invention.

The IF-TV circuit of FIG. 3 comprises two cascode-arranged pairs of transistors $T_1$, $T_2$ and $T_3$, $T_4$, whose operation is similar to that of the amplifier $A_1$ of FIG. 1. The balanced base input of the pair of transistors $T_1$, $T_2$ is connected to the IF-input 1, 1', the base input of the pair of transistors $T_3$, $T_4$ is connected to a fixed operating voltage and its collector output is connected to a supply voltage via collector resistors $R_{1A}$ and $R_{1B}$, respectively, and comprises the first pair of terminals 9, 9'. A resistor $R_{1C}$ is arranged between the collector resistors $R_{1A}$ and, $R_{1B}$ and in association with these two collector resistors and with a degenerative resistor $R_7$ arranged between the emitters of the pair of transistors $T_1$, $T_2$, serves for a first setting of the gain of the amplifier $T_1$-$T_4$ ($A_1$). The resonant circuit FSC, formed by a parallel network $R_1$, $L_1$, $C_1$, is arranged between the pair of terminals 9, 9' and is tuned to the 33.4 MHz sound carrier of the TV-IF signal to be processed. The resistor $R_1$ is variable and is used for a fine setting of the gain of the amplifier $T_1$-$T_4$ ($A_1$) for a correct substraction in the matrix circuit M, which will be described in detail hereinafter.

The pair of terminals 9, 9' is also connected to the base inputs of a balanced pair of transistors $T_7$, $T_8$, in which the 33.4 MHz sound signal selected by the resonant circuit FSC is amplified. The operation of the pair of transistors $T_7$, $T_8$ from the base inputs to the emitter outputs is similar to the amplifier $A_2$ and from the base inputs to the collector outputs is similar to the combination of amplifiers $A_2$ and $A_7$ of FIG. 1. The emitter outputs of the pair of transistors $T_7$, $T_8$ are interconnected via a degenerative resistor $R_2$, and are also connected to the inverting input 4, 4' of the matrix circuit M, and the collector outputs are connected to the signal input 10, 10' of the sound mixing stage SM.

The IF-input 1, 1' is also connected to the base inputs of a balanced pair of transistors $T_5$, $T_6$, which form the amplifier $A_5$ of FIG. 1. The collector outputs of the pair of transistors $T_5$, $T_6$ are connected to the non-inverting input 5, 5' of the matrix circuit M. The emitter outputs of the pair of transistors $T_5$, $T_6$ are interconnected via a degenerative resistor $R_6$, which resistor $R_6$ determines, in association with resistors $R_3$-$R_5$, still to be described hereinafter, of the matrix circuit M, the gain of the amplifier $T_5$, $T_6$ ($A_5$).

The matric circuit M comprises a resistance network $R_3$ to $R_5$, inclusive, the balanced emitter outputs of the pair of transistors $T_7$, $T_8$ being crosswise coupled via the resistors $R_3$ and $R_5$ to the balanced collector outputs of the pair of transistors $T_5$, $T_6$, the resistor $R_4$ being arranged between the co llector outputs. In the resistor $R_4$, the 33.4 MHz sound signal amplified by the pair of transistors $T_7$, $T_8$, is subtracted from the complete TV-IF signal which is amplified by the pair of transistors $T_5$, $T_6$. The result of this subtraction, i.e. the video signal, is available at the non-inverting input 5, 5' of the matrix circuit M, as a result of which the non-inverting input 5, 5' embodies, in the embodiment shown, at the same time the output 6, 6' of the matrix circuit M.

Thereafter, the video signal is coupled to the base input, of a balanced pair of transistors $T_9$, $T_{10}$, which is arranged in cascode with a pair of transistors $T_{11}$, $T_{12}$ and forms in combination therewith the amplifier $A_3$ of FIG. 1. The bases of the pair of transistors $T_{11}$ and $T_{12}$ are connected to the beforementioned fixed operating voltage, to which also the bases of the pair of transistors $T_3$, $T_4$ are connected. The balanced collectors of the pair of transistors $T_{11}$, $T_{12}$ comprise the second pair of terminals 12, 12' between which the resonant circuit FVC is connected. The resonant circuit FVC is formed by a parallel network $L_2$, $C_2$ which is tuned to the 38.9 MHz picture carrier frequency of the TV-If signal to be processed. Consequently, the 38.9 MHz picture carrier which, as shown in FIG. 1, is applied via the amplifier $A_4$ to the picture carrier input 11, 11' of the sound mixing stage SM and also, via the amplifier $A_8$ to the picture carrier input 8, 8' of the video mixing stage VM, is available at the second pair of terminals 12, 12'.

The operation of the pair of transistors $T_9$, $T_{10}$ from the base inputs to the emitter outputs is similar that of the amplifier $A_6$ of FIG. 1, by means of which the video signal at the output 6, 6' of the matrix circuit M is amplified and applied to the signal input 7, 7' of the video mixing stage VM.

For an operation of the TV-IF circuit shown, based on the intercarrier principle, the first pair of terminals 9, 9' must be mutually shortcircuited and both the video-baseband signal and the 5.5 MHz intermediate-frequency sound signal are available at the video output 2, 2' of the video mixing stage VM for further signal processing. In the embodiment shown, the resistors $R_1$ to $R_7$, inclusive had the following resistance values: 10KΩ, 150KΩ, 1KΩ, 1KΩ, 1KΩ, 520Ω, and 235Ω, respectively; the resistors $R_{1A}$, $R_{1B}$ and $R_{1C}$ have the values 5K, 5K and 6.5K, respectively; the coils $L_1$ and $L_2$ have the values 0.6 μH and 0.17 μH, respectively, and the capacitors $C_1$ and $C_2$ have the values 39 μF and 100 pF, respectively.

The embodiments described so far can be simply adapted for processing TV-IF signals having two sound carriers, which are located at, for example, the frequencies of 37.14 MHz and 33.4 MHz. This is, for example, accomplished by chosing the resonant frequency of the resonant circuit FSC to be located between the two sound carrier frequencies, for example at 33.27 MHz and by adjusting the quality factor sufficiently low to select the two sound carriers simultaneously from the complete TV-IF signal. A frequency conversion is then effected simultaneously in the sound mixing stage SM for the two sound carriers by multiplication by the 38.9 MHz picture carrier, one sound carrier being converted to a sound intermediate frequency of 5.5 MHz and the other sound carrier to a sound intermediate frequency of 5.74 MHz. The sound intermediate frequency signals thus obtained are thus both available at the sound output 3, 3' and can be separated from each other after selection and demodulated separately by means of frequency demodulators, not shown, into audio-frequency sound signals.

During the multiplying process in the sound mixing stage SM, crosstalk may, however, be introduced, inter alia owing to non-linearities between the two sound signals to be demodulated. Such a crosstalk is prevented from occurring when the TV-IF circuit in accordance with the invention is realized as shown in the FIGS. 4 and 5.

Figure 4:
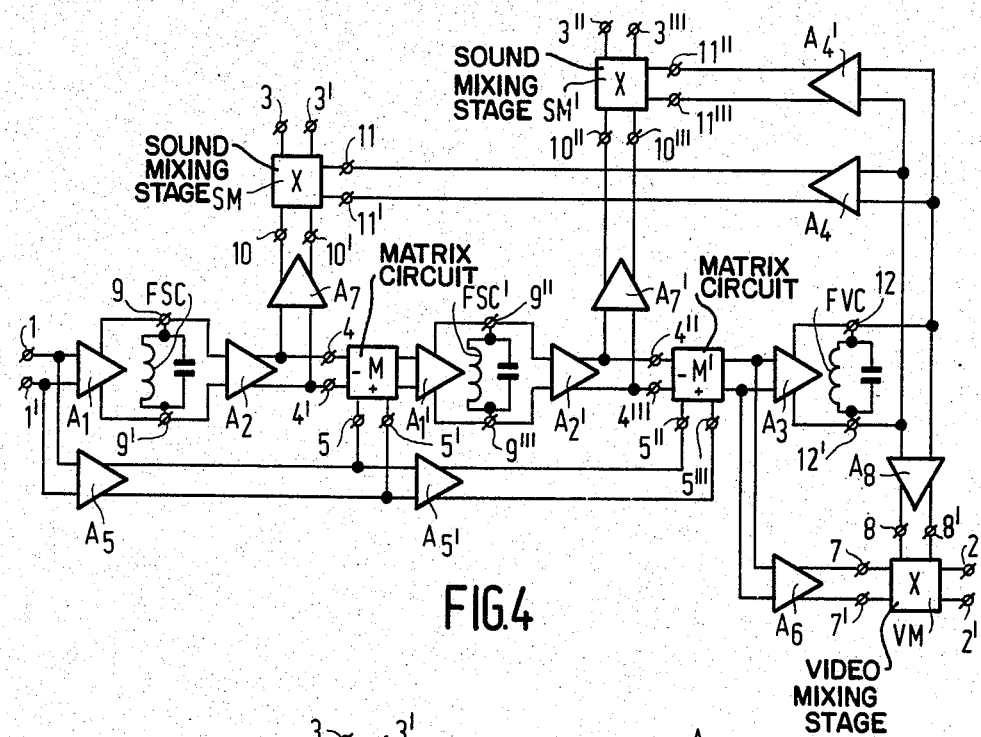
FIG. 4 shows a block diagram of a third embodiment of a TV-IF circuit in accordance with the invention for processing TV-signals having two sound carriers.

FIG. 4 shows a block circuit diagram of a TV-IF circuit in accordance with the invention, in which elements corrresponding to the elements of the TV-IF circuit shown in FIG. 1 have been given the same references.

In the embodiment shown a serial selection or suppression, respectively, of the two sound signals is effected from or in, respectively, the complete TV-IF signal. This selection or suppression, respectively, corresponds for each of the two sound signals to those as regards the sound signal in the TV-IF circuit of FIG. 1. For that purpose a circuit formed by $A_1'$, $A_2'$, $A_5'$, FSC' and M' is arranged between the matrix circuit M and the amplifier $A_3$, which circuit corresponds to the circuit formed by $A_1$, $A_2$, $A_5$, FSC and M. The resonant circuits FSC and FSC' are tuned to the carrier frequencies 33.4 MHz and 33.14 MHz, respectively, of the two sound signals. The further processing of the second 33.14 MHz sound signal is effected via $A_7'$ and SM' in correspondance with and separate from processing of the first 33.4 MHz sound signal, which is effected via $A_7$ and SM. Crosstalk between the two sound signals is then presented from occurring.

In the TV-IF signal at the output of the matrix circuit M, the 33.4 MHz sound signal does not occur and in the TV-IF signal or video signal at the output of the matrix circuit M' both the first 33.4 MHz and the second 33.14 MHz sound signals are missing. The 38.9 MHz picture carrier, selected by means of the resonant circuit FVC, consequently comprises substantially no components of the sound signals, so that, in addition, an interference-free demodulation or frequency conversion, respectively, of the video signal or the two sound signals, respectively, is ensured.

Figure 5:
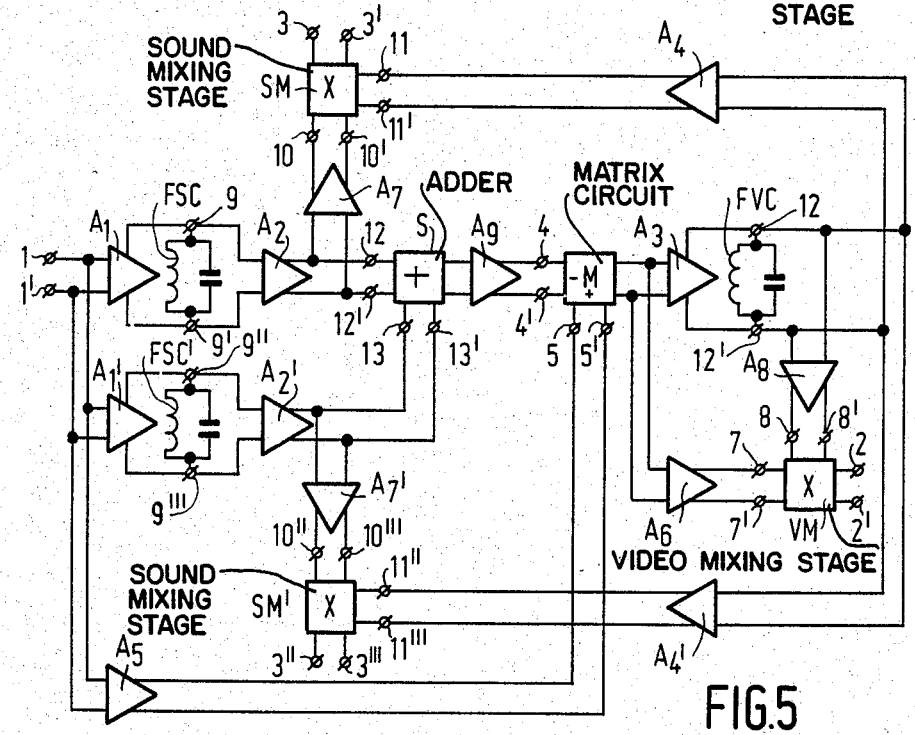
FIG. 5 shows a block diagram of a fourth embodiment of a TV-IF circuit in accordance with the invention for an alternative processing of TV-signals having two sound carriers.

FIG. 5 shows a block circuit diagram of a TV-IF circuit in accordance with the invention in which the elements corresponding to the elements of the TV-IF circuit shown in FIG. 4 have been given the same references.

In this embodiment, a mutually separate, parallel selection of the two sound signals from the complete TV-IF signal is effected. By maintaining the mutual separation during the further processing of the sound signals, crosstalk between the two sound signals is prevented from occurring.

For the suppression of the two sound signals, in the TV-IF signal the two sound signals are first added together in an adder circuit S and subtracted together from the complete TV-IF signal in the matrix circuit M. The video signal thus obtained at the output of the matrix circuit M contains no components of the two sound signals, which, as in the aforementioned TV-IF circuit ensures, in addition, interference-free video and sound signals at the respective outputs 2, 2'; 3, 3' and 3", 3'". It will be obvious that the idea on which the embodiments of FIGS. 4 and 5 are based is also applicable to the TV-IF circuit of FIG. 2.

What is claimed is:
1. A TV-IF circuit comprising a balanced video signal path arranged between an IF-output and a video signal output and a balanced sound signal path arranged between the IF-input and a sound signal output, these paths including a video mixing stage and a sound mixing stage, respectively, characterized in that said TV-IF circuit further comprises a matrix circuit having a balanced, non-inverting and a balanced, inverting input, as well as balanced output, said matrix circuit being included via the non-inverting input and the output thereof in one of said two signal paths between the IF-input and a signal input of the mixing stage in said one signal path, the other signal path, between the IF-input and a signal input of the mixing stage in said other signal path, being connected to the balanced, inverting input of the matrix circuit and comprising, between the IF-input and the matrix circuit, a balanced first pair of terminals having connected therebetween a resonant circuit having resonant frequency which corresponds to a sound carrier frequency of the TV-IF signal applied to the IF-input.

2. A TV-IF circuit as claimed in claim 1, characterized in that the matrix circuit is included in the video signal path and the balanced first pair of terminals is included in the sound signal path, said resonant circuit connected between said first pair of terminals having a band rejection characteristic.

3. A TV-IF circuit as claimed in claim 2, characterized in that said TV-IF circuit further comprises a further balanced sound signal path arranged between the balanced output of said matrix circuit and a further sound mixing stage, said further balanced sound signal path including a further balanced pair of terminals, at said matrix circuit balanced output, having connected therebetween a band rejection resonant circuit having a resonant frequency which corresponds to a further sound carrier frequency of the TV-IF signal applied to the IF-input, said further balanced pair of terminals being also connected to a balanced, inverting input of a further matrix circuit, said further matrix circuit having a balanced, non-inverting input connected to the IF-input and a balanced output connected to the video mixing stage.

4. A TV-IF circuit as claimed in claim 2, characterized in that said TV-IF circuit further comprises a further balanced sound signal path arranged between said IF-input and a further sound mixing stage, said further balanced sound signal path including a further balanced pair of terminals, connected to said IF-input, having connected therebetween a band rejection resonant circuit having a resonant frequency which corresponds to a further sound carrier frequency of the TV-IF signal applied to the IF-input, said balance pair of terminals and said further balanced pair of terminals being connected, respectively, to respective balanced inputs of an adder circuit, a balanced output thereof being connected to the balanced, inverting input of said matrix circuit.

5. A TV-IF circuit as claimed in claim 1, 2, 3 or 4, characterized in that the sound mixing stage is a linear stage and comprises a balanced signal input and a balanced carrier input one of said inputs being arranged in parallel with the inverting input of a matrix circuit and the other input being arranged in parallel with the output of the matrix circuit, the signal path between the matrix circuit and the carrier input of the sound mixing stage comprising a balanced second pair of terminals for connecting therebetween a further resonant circuit having a resonant frequency which correspond to the picture carrier frequency of the TV-IF signal applied to the IF-input.

6. A TV-IF circuit as claimed in claim 5, characterized in that the video mixing stage comprises a synchronous detector having a balanced signal input and a balanced carrier input, the carrier input being connected to the carrier input of the sound mixing stage.

7. A TV-IF circuit as claimed in claim 1, characterized in that said TV-IF circuit comprises a push-pull amplifier connected to the IF-input, the output of the push-pull amplifier being connected to the balanced first pair of terminals and also to a base input of a balanced first pair of transistors, and also by a balanced second pair of transistors which are also connected to the IF-input, the emitter output of the first pair of transistors being connected via the matrix circuit to the collector output of the second pair of transistors, the matrix circuit comprising two resistors which connect said emitter output of the first pair of transistors crosswise to said collector output of the second pair of transistors, also comprising a resistor which interconnects said two resistors.

8. A TV-IF circuit as claimed in claim 1, 2, 3 or 4, wherein said TV-IF circuit is used for intercarrier sound processing characterized in that said resonant circuit, having the resonant frequency corresponding to the sound carrier frequency, is short-circuited.

* * * * *